United States Patent
Seror-Goguet et al.

(10) Patent No.: US 7,967,245 B2
(45) Date of Patent: Jun. 28, 2011

(54) BRACE-LOCKING DEVICE FOR AN AIRCRAFT UNDERCARRIAGE

(75) Inventors: Christelle Seror-Goguet, Le Plessis Robinson (FR); Laurent Martinez, Maintenon (FR)

(73) Assignee: Messier-Dowty S.A. (FR)

( * ) Notice: Subject to any disclaimer, the term of this patent is extended or adjusted under 35 U.S.C. 154(b) by 694 days.

(21) Appl. No.: 12/114,268

(22) Filed: May 2, 2008
(Under 37 CFR 1.47)

(65) Prior Publication Data
US 2009/0057485 A1    Mar. 5, 2009

(30) Foreign Application Priority Data

May 3, 2007    (FR) ...................... 07 03175

(51) Int. Cl.
*B64C 25/26* (2006.01)
*B64C 25/18* (2006.01)
(52) U.S. Cl. ................................. 244/102 SL
(58) Field of Classification Search .............. 244/100 R, 244/102 R, 102 A, 102 SL, 102 SS; 292/62, 292/69, 334, DIG. 61; 294/82.33, 82.2
See application file for complete search history.

(56) References Cited

U.S. PATENT DOCUMENTS

| 2,444,319 | A | * | 6/1948 | Winter | .................... 244/102 SL |
| 2,661,171 | A | | 12/1953 | Allen | |
| 5,022,609 | A | | 6/1991 | Cranston | |
| 5,288,037 | A | * | 2/1994 | Derrien | .................... 244/102 SL |

FOREIGN PATENT DOCUMENTS

| GB | 644147 | 10/1950 |
| GB | 704080 | 2/1954 |

* cited by examiner

*Primary Examiner* — Tien Dinh
*Assistant Examiner* — Richard R Green
(74) *Attorney, Agent, or Firm* — McCormick, Paulding & Huber LLP

(57) ABSTRACT

The invention relates to a wind-brace device for an aircraft undercarriage, the device comprising a hinged brace movable between a folded position and a stabilization position for stabilizing the undercarriage in the deployed position, a stabilizer member for stabilizing the brace comprising two hinged-together arms, one of the arms having one end hinged to the brace about a hinge axis, and a spring member for urging the arm of the stabilizer member towards the locked position. The spring member is connected to a lever hinged to the brace, the lever presenting a slot in which there is engaged a finger secured to the arm that is hinged to the brace.

1 Claim, 3 Drawing Sheets

BRACE-LOCKING DEVICE FOR AN AIRCRAFT UNDERCARRIAGE

CROSS-REFERENCE TO RELATED APPLICATION

This application is entitled to the benefit of and incorporates by reference essential subject matter disclosed in French Patent Application No. 07 03175 filed on May 3, 2007.

FIELD OF THE INVENTION

The invention relates to a brace-locking device for an aircraft undercarriage.

BACKGROUND OF THE INVENTION

In general, undercarriages are hinged to the aircraft to move between a deployed position and a retracted position. To stabilize an undercarriage in the deployed position, it is known to make use of a wind-brace member or brace.

In this respect, so-called "breakable" braces are known that comprise two links that are hinged together by means of a central hinge or knee, one of the links having one end hinged to the undercarriage while the other link has one end hinged to the structure of the aircraft. A stabilizer member keeps the two links in alignment when the undercarriage is in the deployed position, thereby stabilizing the undercarriage. In contrast, while the undercarriage is being retracted, the stabilizer member allows the links to hinge freely at the knee, thereby enabling the brace to be folded and the undercarriage to be retracted.

In conventional manner, the stabilizer member itself comprises two hinged-together arms, one of the arms having one end hinged to one of the arms of the brace, the other arm having one end hinged to the structure of the aircraft. Abutments define a locked position in which said arms are substantially in alignment. A spring member holds the arms of the stabilizer member in the locked position. The assembly forms a locking device that enables the brace to be held in the aligned position.

An unlocking actuator working against the springs enables the alignment between the arms of the stabilizer member to be broken, and thus enables the brace to be folded. The prior art is illustrated in particular by the following documents: U.S. Pat. Nos. 5,022,609; 2,661,171; GB 704 080; and GB 644 147.

OBJECT OF THE INVENTION

An object of the invention is to provide a novel wind-brace device enabling the stroke of the spring member to be limited.

BRIEF SUMMARY OF THE INVENTION

According to the invention, there is proposed a wind-brace device for an aircraft undercarriage, the device comprising:
 a hinged brace movable between a folded position and a stabilization position for stabilizing the undercarriage in the deployed position;
 a stabilizer member for stabilizing the brace and comprising two hinged-together arms, one of the arms having one end hinged to the brace about a hinge axis, and abutments defining a locked position of the arms in which the brace is held in the stabilization position; and
 a spring member for returning the arms of the stabilizer member towards the locked position;

wherein, according to the invention, the spring member is connected to a lever hinged to the brace, the lever presenting a slot in which there is engaged a finger secured to the arm that is hinged to the brace, the lever being movable between:
 a confirmation position in which the finger is engaged in an turned-back portion of the slot, while the stabilizer member is in the locked position, the lever co-operating with the finger to confirm that the stabilizer member is in the locked position; and
 a release position in which the finger is engaged in a curved portion of the slot that extends along a circular arc centered on the hinge axis, while the stabilizer member is not in the locked position.

Thus, since the curved portion of the slot extends over a circular arc centered on the hinge of the arm of the stabilizer member, the lever does not move any further regardless of the angular position of the stabilizer member arm relative to the brace. The stroke of the spring is thus limited, thereby reducing the forces acting on the spring and increasing its lifetime.

BRIEF DESCRIPTION OF THE DRAWINGS

The invention can be better understood in the light of the following description made with reference to the accompanying drawings, in which.

DETAILED DESCRIPTION OF THE INVENTION

Figure 1:
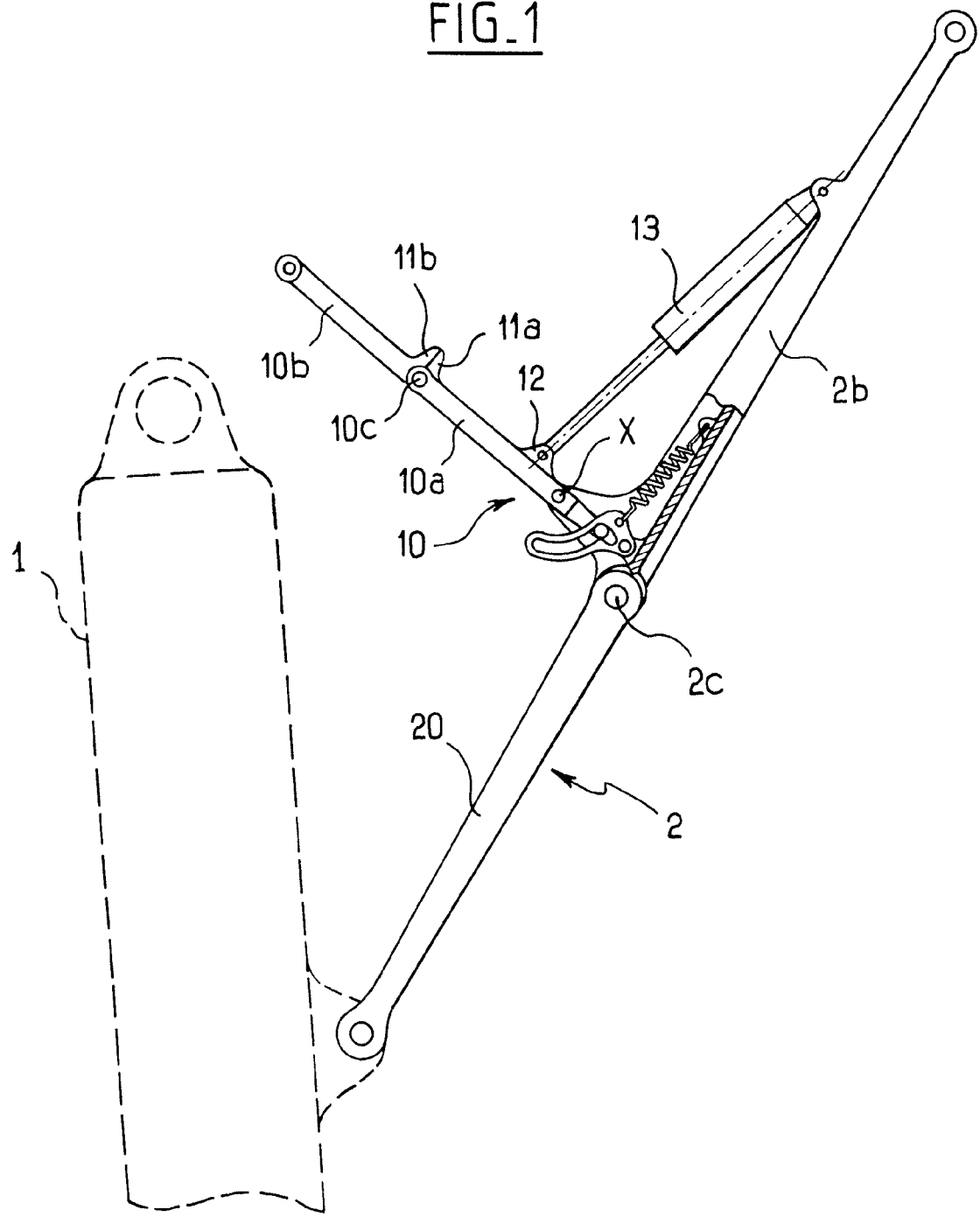
FIG. 1 is a face view of a brace of the invention, with the brace being in its stabilization position.

With reference to FIG. 1, the wind-brace device shown is for stabilizing an aircraft undercarriage 1 in the deployed position. The device comprises a brace 2 made up of a bottom link 2a hinged to the undercarriage 1, and a top link 2b hinged to the structure of the aircraft. The links 2a and 2b are hinged to each other via a central hinge or knee 2c.

A stabilizer member 10 serves to hold the links 2a, 2b substantially in alignment such that the undercarriage is stabilized in the deployed position. Below, this substantially aligned position is referred to as the "aligned position", or as the "stabilization position" for the undercarriage in the deployed position.

The stabilizer member has a bottom arm 10a hinged to the top link 2b of the brace about a hinge axis X, and a top arm 10b hinged to the structure of the aircraft. The arms are hinged to each other by a central hinge 10c. The arms 10a, 10b are provided with abutments 11a, 11b that co-operate to define an arm-locking position in which the arms 10a, 10b are substantially in alignment.

The bottom arm 10a is provided with a lug 12 for receiving one end of an unlocking actuator 13 which, when controlled for retraction, breaks the alignment between the arms 10a, 10b, thereby enabling the brace to be folded.

Figure 2:
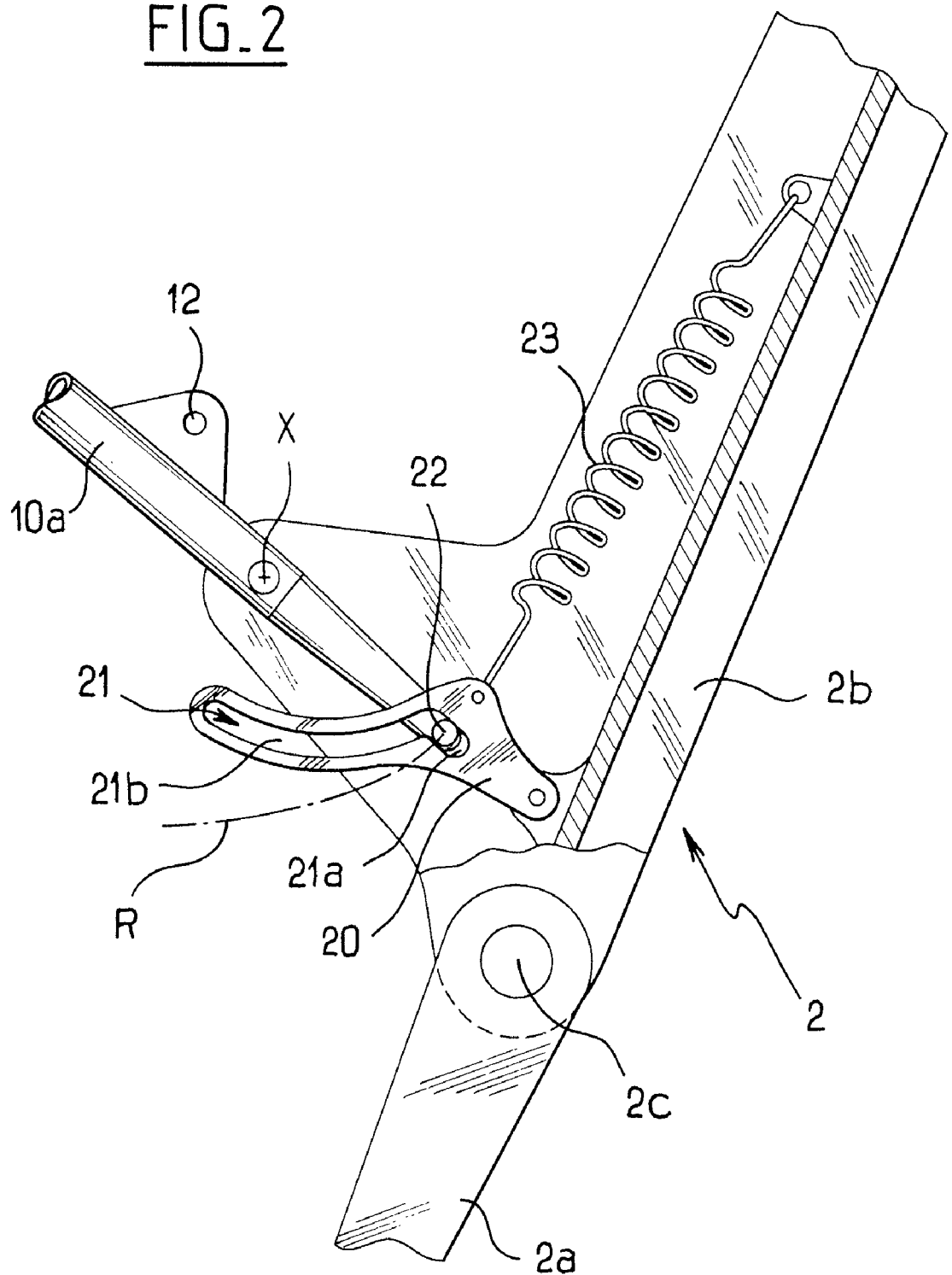
FIG. 2 is a view on a larger scale showing a fragment of FIG. 1.
Figure 3:
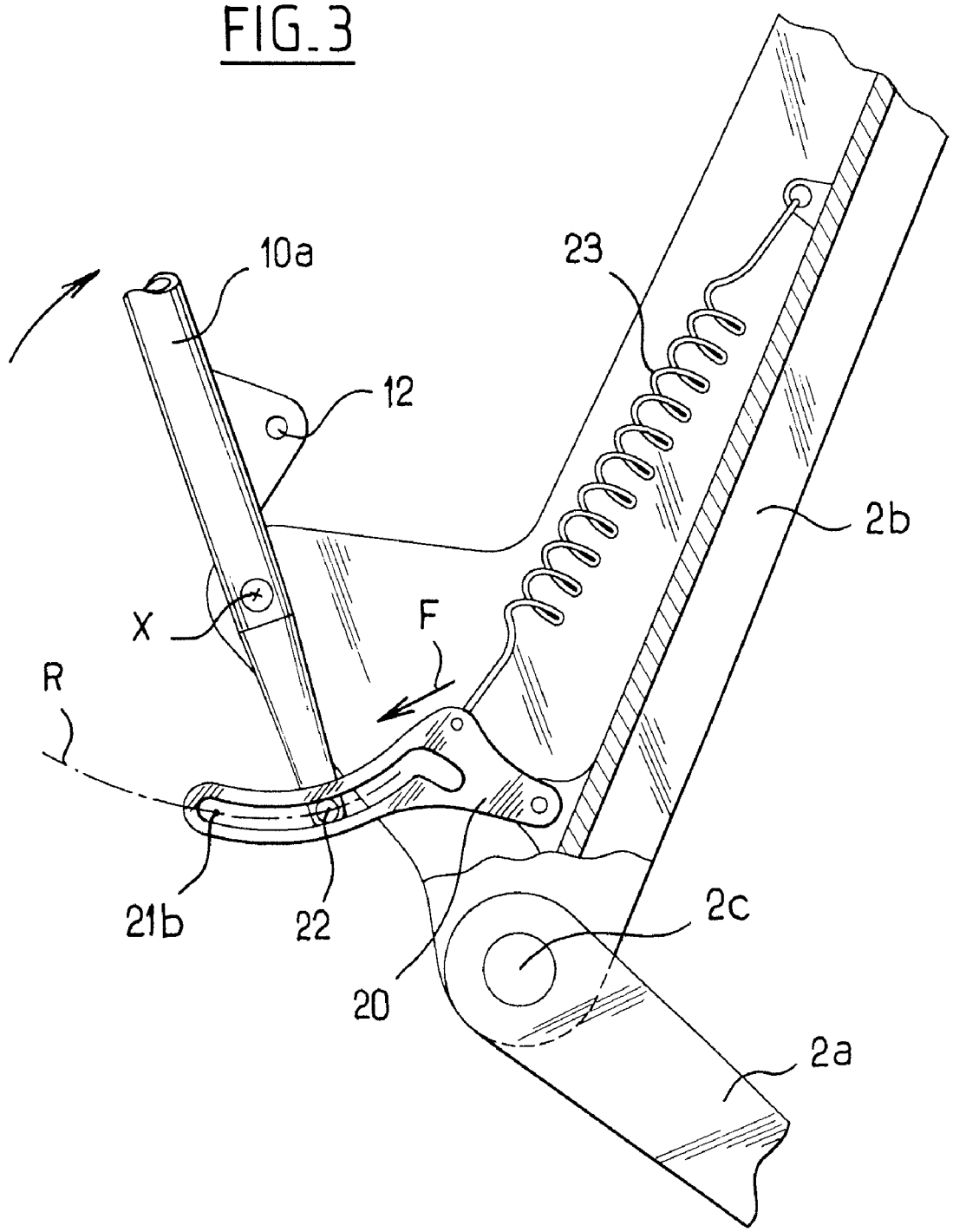
FIG. 3 is a view analogous to FIG. 2, showing a situation in which the brace is not in its stabilization position.

Furthermore, the stabilizer member includes a confirmation member for confirming the arms 10a, 10b in the locking position, as is described in detail below with reference to FIG. 2.

The confirmation member comprises a lever 20 hinged to the top link 2b of the brace. The lever has a slot 21 including a turned-back portion 21a and a curved portion 21b. A finger 22 secured to one end of the bottom arm 10a is engaged in the slot 21. A spring member 23 is connected between the lever 21 and the top link 2a of the brace 2. The spring member 23 in this example works in traction.

The wind-brace device operates as follows. In the position shown in FIG. 2, the finger 22 is engaged in the turned-back portion 21a of the slot 21. This portion presents a bearing face that is substantially parallel to a line passing between the hinge axis 10 of the bottom arm 10a and the hinge of the lever. The spring member 23 pulls on the lever 20 which bears against the finger 22 so as to confirm the abutments 11a, 11b against each other, thereby tending to confirm the arms in the locking position. In the absence of action from the unlocking actuator 13, the brace 2 is thus held in the aligned position. This position of the lever is referred to as the "confirmation position".

When it is necessary to retract the undercarriage, it is appropriate to break the alignment between the links 2a, 2b of the brace. To do this, it is appropriate firstly to break the alignment between the arms 10a, 10b of the stabilizer member. For this purpose, the unlocking actuator 13 is actuated so as to retract, thereby causing the bottom arm 10a to pivot about the hinge X in a direction that tends to lay the bottom arm 10a against the top link 2b.

In so doing, the finger 22 pushes the lever 20 in the direction of arrow F against the spring member 23 which lengthens, until the finger 21 penetrates into the curved portion 21b of the slot 21. In this position, the curved portion 21b extends along a circular arc R (represented by chain-dotted lines) centered on the hinge axis X. The bottom arm 10a can then continue to pivot so that the finger 22 moves in the curved portion 21b of the slot 21. Nevertheless, the lever 20 no longer pivots, such that the spring member 23 no longer lengthens. The force it exerts is thus limited to a value that is fixed and independent of the angular position of the bottom arm 10a relative to the top link 2b. The corresponding position of the lever is referred to as the "release position".

In conventional linkages in which the spring member is connected directly to the bottom arm 10b, the spring member would continue to lengthen, thereby being subjected to large forces, which in practice oppose retraction of the undercarriage.

The invention is not limited to the above description, but on the contrary covers any variant coming within the ambit defined by the claims.

What is claimed is:

1. A wind-brace device for an aircraft undercarriage, the device comprising:
 a hinged brace movable between a folded position and a stabilization position for stabilizing the undercarriage in a deployed position;
 a stabilizer member for stabilizing the brace and comprising two hinged-together arms, one of the arms having one end hinged to the brace about a hinge axis, and abutments defining a locked position of the arms in which the brace is held in the stabilization position; and
 a spring member for returning the arms of the stabilizer member towards the locked position;
 wherein the spring member is connected to a lever hinged to the brace, the lever presenting a slot in which there is engaged a finger secured to the arm that is hinged to the brace, the lever being movable between:
 a confirmation position in which the finger is engaged in a turned-back portion of the slot, while the stabilizer member is in the locked position, the lever co-operating with the finger to confirm that the stabilizer member is in the locked position; and
 a release position in which the finger is engaged in a curved portion of the slot that extends along a circular arc centered on the hinge axis, while the stabilizer member is not in the locked position.

* * * * *